United States Patent
Wang et al.

(10) Patent No.: US 8,497,845 B2
(45) Date of Patent: Jul. 30, 2013

(54) SENSING STRUCTURE OF TOUCH PANEL

(75) Inventors: Wen-Che Wang, New Taipei (TW); Bo-Han Chu, New Taipei (TW)

(73) Assignee: Chunghwa Picture Tubes, Ltd., Bade, Taoyuan (TW)

( * ) Notice: Subject to any disclaimer, the term of this patent is extended or adjusted under 35 U.S.C. 154(b) by 316 days.

(21) Appl. No.: 13/049,914

(22) Filed: Mar. 17, 2011

(65) Prior Publication Data
US 2012/0182230 A1    Jul. 19, 2012

(30) Foreign Application Priority Data
Jan. 14, 2011    (TW) .............................. 100101346 A

(51) Int. Cl.
*G06F 3/041*    (2006.01)

(52) U.S. Cl.
USPC .................. 345/173; 345/174; 178/18.01

(58) Field of Classification Search
USPC .................. 345/173–179; 178/18.01–18.06
See application file for complete search history.

(56) References Cited

U.S. PATENT DOCUMENTS

| | | | |
|---|---|---|---|
| 2009/0262094 A1 | 10/2009 | Lin | |
| 2010/0045625 A1* | 2/2010 | Yang et al. | 345/173 |
| 2011/0057900 A1* | 3/2011 | Huang et al. | 345/174 |
| 2011/0216018 A1* | 9/2011 | Kim et al. | 345/173 |
| 2011/0285641 A1* | 11/2011 | Huang | 345/173 |

FOREIGN PATENT DOCUMENTS

| | | |
|---|---|---|
| JP | 2010218542 A | 9/2010 |
| JP | 2011165159 A | 8/2011 |
| JP | 2011192251 A | 9/2011 |
| JP | 2011528147 A | 11/2011 |
| TW | M375934 U1 | 3/2010 |

* cited by examiner

*Primary Examiner* — Amare Mengistu
*Assistant Examiner* — Premal Patel
(74) *Attorney, Agent, or Firm* — Winston Hsu; Scott Margo

(57) ABSTRACT

A sensing structure of a touch panel includes a substrate, a plurality of sensing electrodes, a plurality of electro static discharge (ESD) protection electrodes, a plurality of first bridges, and a passivation layer. The sensing electrodes, the ESD protection electrodes, and the first bridges are disposed on the substrate. The passivation layer is disposed between the sensing electrode and the first bridge, and disposed between the ESD protection electrode and the first bridge. The passivation layer has a plurality of contact holes, and at least one sensing electrode is electrically connected to the ESD protection electrode via the contact hole and the first bridge.

10 Claims, 12 Drawing Sheets

SENSING STRUCTURE OF TOUCH PANEL

BACKGROUND OF THE INVENTION

1. Field of the Invention

The present invention relates to a sensing structure of a touch panel, and more particularly, to a sensing structure of a touch panel capable of electro static discharge protection.

2. Description of the Prior Art

The touch panel has been widely used in the input interfaces of the instruments for its properties such as the diversification for design and the interaction between machines and humans. In recent years, more consumer electronics, such as mobile phones, GPS navigator systems, tablet computers and laptop computers, are employed with touch display panels.

There are many diverse technologies of touch panel, and the resistance touch technology, the capacitive touch technology and the optical touch technology are the main touch technologies. The capacitive touch technology has become the mainstream touch technology for the high-end and the mid-end consumer electronics, because the capacitive touch panel has advantages such as high precision, multi-touch, better endurance, and higher touch resolution.

A capacitive touch panel is disclosed in T.W. Pat. No. M375,934 issued Mar. 11, 2010 to Wu. The capacitive touch panel includes a plurality of first electrode sets and a plurality of second electrode sets disposed vertically. Each of the first electrode sets includes a plurality of first transparent electrodes and a plurality of conducting lines electrically connected with the two adjacent first transparent electrodes. Each of the second electrodes sets includes a plurality of second transparent electrodes, and a connecting point is disposed between a conducting line and the two adjacent second transparent electrodes. The connecting point includes a transparent insulating layer covering each of the conducting lines, an ESD protection line connected to the two adjacent second transparent electrodes over the transparent insulating layer, and a metal line disposed on the surface of the ESD protection line, wherein the two ends of the metal line are disconnected with the two adjacent second transparent electrodes. Because the electrical signals of the second electrode set are transmitted via the ESD protection lines and the metal lines, the ESD protection effect of the metal lines is enhanced.

Please refer to FIG. 1. FIG. 1 is a schematic diagram illustrating a top view of the conventional sensing structure of the touch panel. As shown in FIG. 1, the conventional sensing structure of the touch panel includes a plurality of first sensing electrodes 14C, a plurality of second sensing electrodes 14D, and a plurality of bridges 11. The first sensing electrodes 14C are disposed interlacedly with the second sensing electrodes 14D. Each of the second sensing electrodes 14D is electrically connected with the adjacent second sensing electrodes 14D in a horizontal direction X. In a vertical direction Y, each of the first sensing electrodes 14C is electrically connected with the adjacent first sensing electrodes 14D via the bridge 11. The bridges 11 and the first sensing electrodes 14C/second sensing electrodes 14D are disposed on different layers. In the capacitive touch technology, the sensing electrodes are used to detect the variations of electrical capacitances around the touch points, and the feedback signals are transmitted via the connecting lines along the direction X and the direction Y for positioning the touch points. When operating the capacitive touch panel, electro static charges may be generated and result in an electro static discharge (ESD) phenomenon in the touch panel. Because the resistance inside the touch panel is close to zero, a heavy current may be generated by the ESD in the touch panel. The heavy current may pass through the bridges 11, which have relatively higher resistance. An electric energy may be released at the bridge 11 and burn down the bridges 11. The reliability of the touch panel is affected seriously by the ESD damages, and therefore, a solution for ESD damages is eagerly demanded.

SUMMARY OF THE INVENTION

It is one of the objectives of the present invention to provide a sensing structure of a touch panel for improving the reliability problem caused by the ESD damages in the touch panel.

To achieve the purpose described above, the present invention provides a sensing structure of a touch panel. The sensing structure of the touch panel includes a substrate, a plurality of sensing electrodes, a plurality of ESD protection electrodes, a plurality of first bridges, and a passivation layer. The sensing electrodes, the ESD electrodes, the first bridges are disposed on the substrate. The passivation layer is disposed between the sensing electrodes and the first bridges, and the passivation layer is also disposed between the ESD protection electrodes and the first bridges. Besides, the passivation layer has a plurality of contact holes, and at least one of the sensing electrodes is electrically connected with the ESD protection electrode via the contact holes and the first bridges.

According to the design of the ESD protection electrodes in the present invention, the energy of the ESD damage, which may be generated during the fabrication process or the operation of the touch panel, may be released. The probability of damaging the connecting lines may then be decreased, and the reliability of the touch panel may be effectively improved. Besides, the manufacturing method of the sensing structure of the touch panel in the present invention may be integrated into the current process of the touch panel, and therefore, no extra process is required. The cost and the complexity of the manufacturing process of the touch panel may not be increased.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
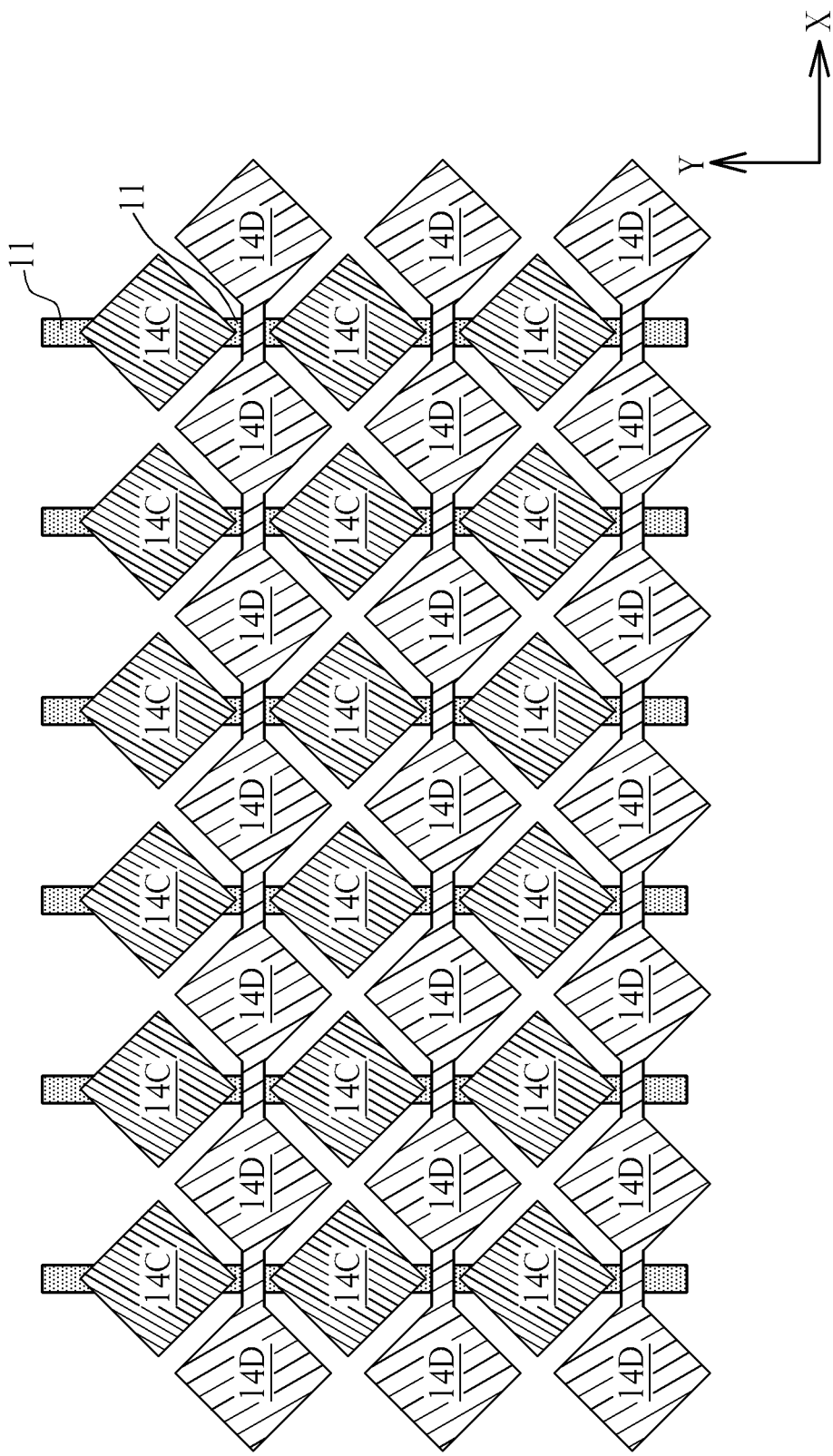
FIG. 1 is a schematic diagram illustrating a top view of the conventional sensing structure of the touch panel.

Certain terms are used throughout the description and following claims to refer to particular components. As one skilled in the art will understand, electronic equipment manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . " In addition, to simplify the descriptions and make it more convenient to compare between each embodiment, identical components are marked with the same reference numerals in each of the following embodiments. Please note that the figures are only for illustration and the figures may not be to scale. Additionally, the terms such as "first" and "second" in this context are only used to distinguish different components and do not constrain the order of generation.

Figure 2:
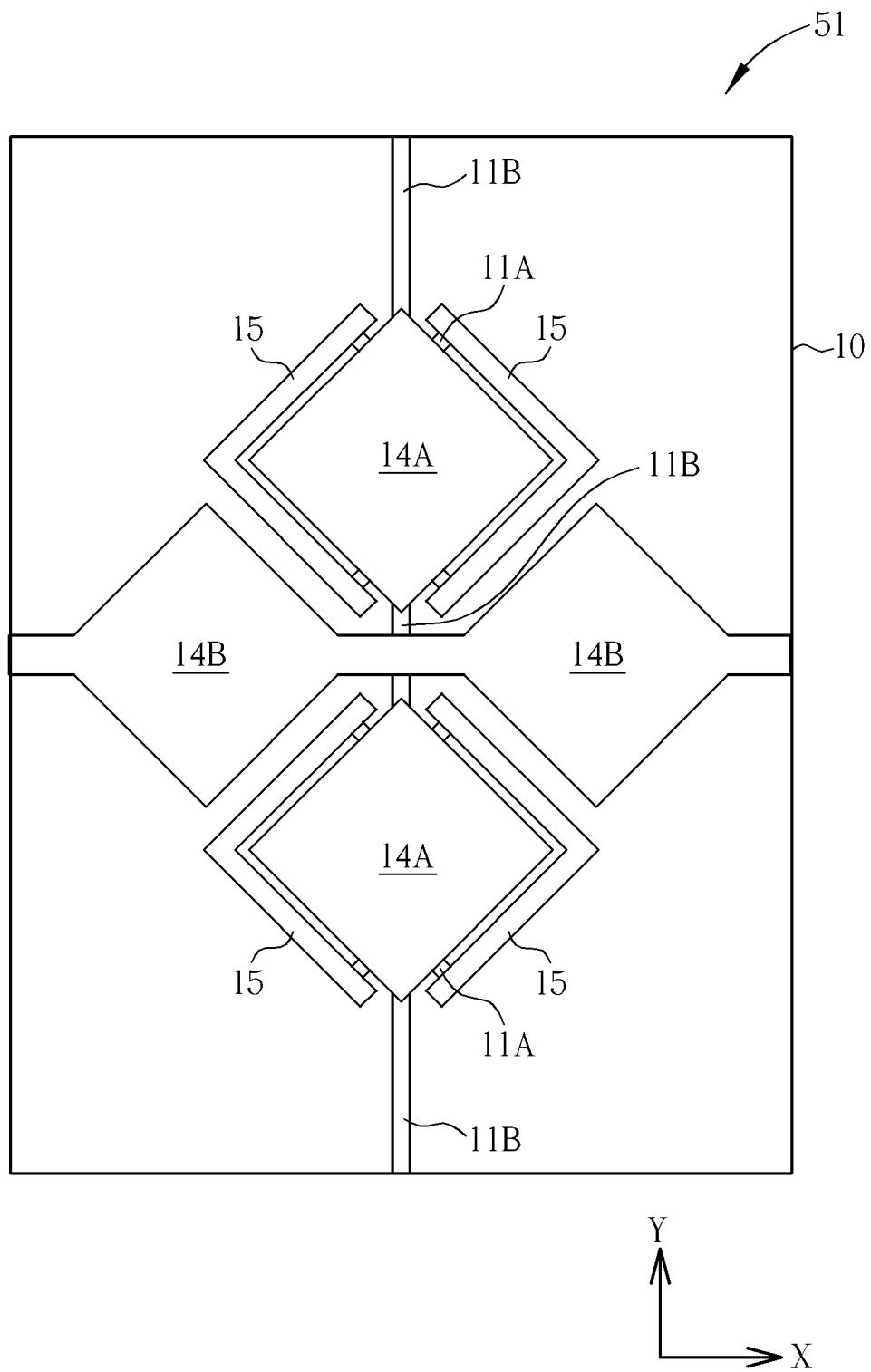
FIGS. 2-4 are schematic diagrams illustrating the sensing structure of the touch panel according to the first preferred embodiment of the present invention.
Figure 3:
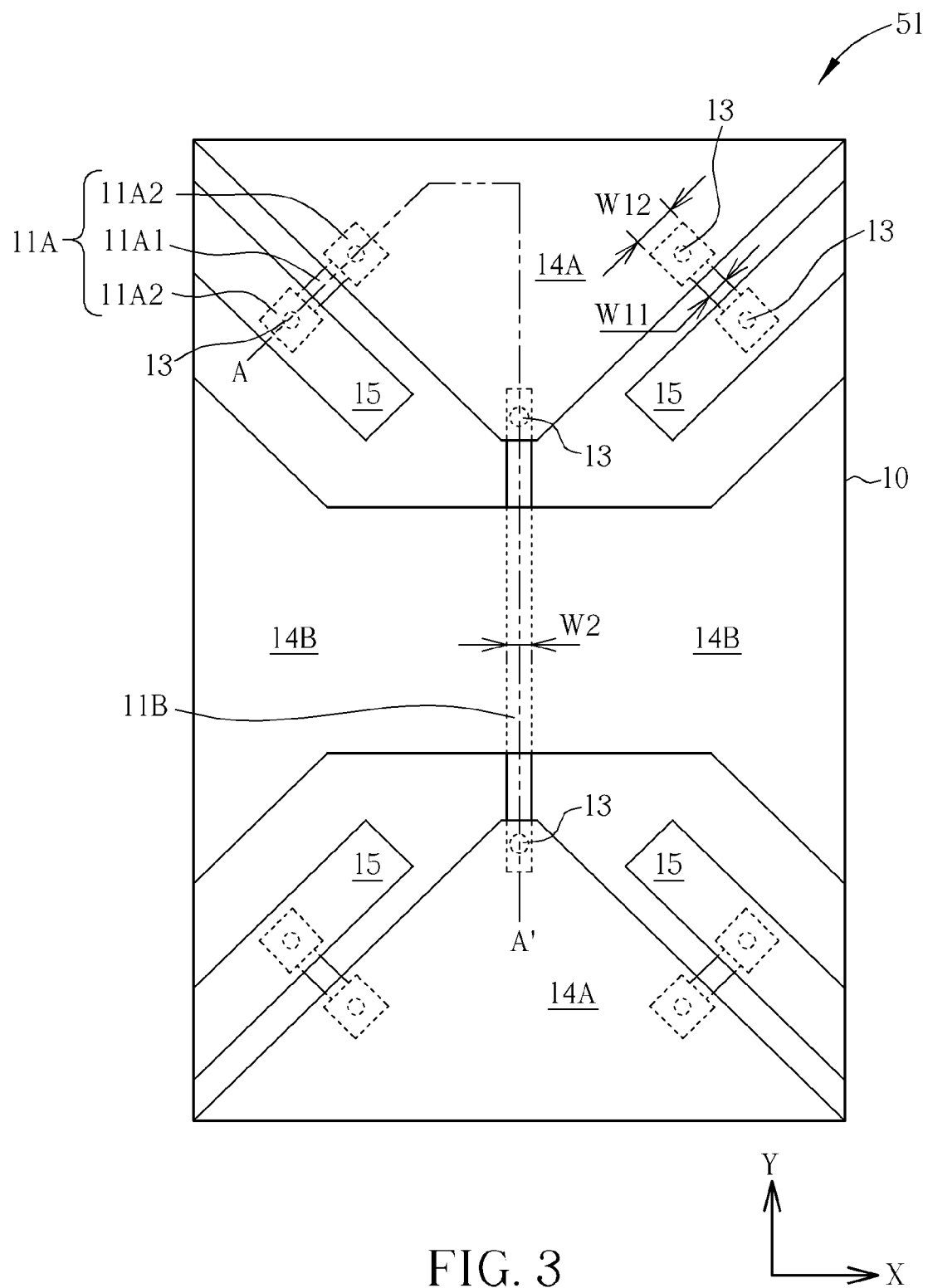
Figure 4:
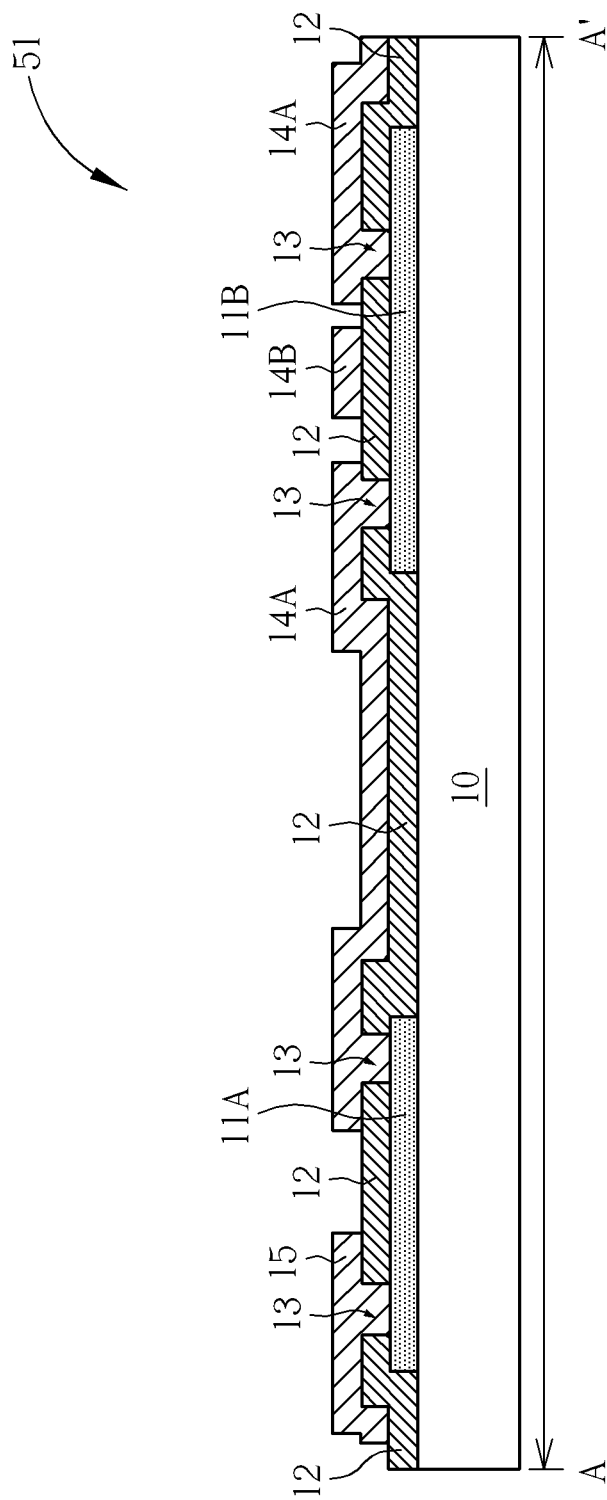

Please refer to FIGS. 2-4. FIGS. 2-4 are schematic diagrams illustrating the sensing structure of the touch panel according to a first preferred embodiment of the present invention. FIG. 2 is a schematic diagram illustrating a top view of the sensing structure of the touch panel. FIG. 3 is a perspective of a local enlargement of FIG. 2. FIG. 4 is a schematic diagram illustrating a cross-sectional view along a line A-A' in FIG. 3. As shown in FIGS. 2-4, the sensing structure 51 of the touch panel in the first preferred embodiment of the present invention includes a substrate 10, a plurality of first bridges 11A disposed on the substrate 10, a plurality of second bridges 11B disposed on the substrate 10, a passivation layer 12 (not shown in FIG. 2 and FIG. 3) disposed on the first bridges 11A and the second bridges 11B, a plurality of sensing electrodes 14A/14B disposed on the passivation layer 12, and a plurality of ESD protection electrodes 15 disposed on the passivation layer 12. The sensing electrodes 14A are disposed interlacedly with the sensing electrodes 14B. A pattern of each of the sensing electrodes 14A is separated from the pattern of other sensing electrodes 14A, and the patterns of the sensing electrodes 14B are connected in a horizontal direction X. Each of the ESD protection electrodes 15 is disposed between each of the sensing electrodes 14A and each of the sensing electrodes 14B. Each of the patterns of the ESD protection electrodes 15 is separated from the patterns of the sensing electrodes 14A and the sensing electrodes 14B. In addition, the passivation layer 12 has a plurality of contact holes 13, and the contact holes 13 respectively expose a part of the first bridges 11A and a part of the second bridges 11B. At least one of the sensing electrodes 14A is electrically connected with the ESD protection electrode 15 via the contact holes 13 and the first bridges 11A, and at least one of the sensing electrodes 14A is electrically connected with the adjacent sensing electrode 14A in a vertical direction Y via the contact holes 13 and the second bridges 11B. In other embodiments of the present invention, some of the ESD protection electrodes 15 may selectively be electrically connected with the sensing electrodes 14B via the first bridges 11A, according to different design purposes, but the sensing electrodes 14A are still electrically disconnected with the sensing electrodes 14B. In this embodiment, the first bridges 11A and the second bridges 11B are formed by an identical conductive material layer, and the conductive material layer may include such as molybdenum (Mo), aluminum (Al), titanium (Ti) or other appropriate conductive materials. The sensing electrodes 14A/14B and the ESD protection electrodes 15 are formed by an identical transparent conductive material layer, and the transparent conductive material layer may include indium tin oxide (ITO), indium zinc oxide (IZO), aluminum zinc oxide (AZO), or other appropriate conductive materials. In other embodiments in the present invention, the sensing electrodes and the ESD protection electrodes may be formed by an opaque conductive material layer or by a conductive material layer with low transmittance. For example, appropriate opaque conductive materials or conductive materials with low transmittance may be used to form the sensing electrodes and the ESD protection electrodes to achieve other purposes, such as lower cost, while the touch panel is not applied with the display panel or there are no demands for high transmittance of the whole panel. Please refer to FIG. 3. As shown in FIG. 3, each of the first bridges 11A includes two contact parts 11A2 and one connection part 11A1. A width W11 of the connection part 11A1 may be substantially wider than or equal to a width W2 of the second bridge 11B, and a width W12 of the contact part 11A2 may be substantially wider than the width W11 of the connection part 11A1. In the embodiments of the present invention, preferably, the width W12 of the contact part 11A2 may be substantially equal to twice the width W11 of the connection part 11A1, but the present invention is not limited to this. According to the above-mentioned design, the probability that the electric current passes through the ESD protection electrodes 15 may be increased by controlling the width of the first bridge 11A connected with the ESD protection electrode 15. The ESD protection purpose may then be achieved, because a heavy current generated by the ESD may tend to be led toward the ESD protection electrode 15 via the bridge 11A. The mechanism of the ESD protection in the present invention will be detailed in the following content.

Please refer to FIG. 4, and refer to FIG. 3 together. According to the first preferred embodiment of the present invention, a manufacturing method of the sensing structure of the touch panel includes the following steps. Firstly, a substrate 10 is provided. A patterned conductive layer is formed on the substrate 10 for forming a plurality of first bridges 11A and a plurality of second bridges 11B. Each of the first bridges 11A includes two contact parts 11A2 and a connection part 11A1. A width W11 of the connection part 11A1 is substantially wider than or equal to a width W2 of the second bridge 11B, and a width W12 of the contact part 11A2 may be substantially wider than the width W11 of the connection part 11A1. Subsequently, a passivation layer 12 is formed to cover the substrate 10, the first bridges 11A, and the second bridges 11B. Afterward, a plurality of contact holes 13 are formed in the passivation layer 12. The contact holes 13 respectively expose a part of the first bridges 11A and a part of the second bridges 11B. A patterned transparent conductive layer is then formed on the passivation layer 12 for forming a plurality of sensing electrodes 14A, a plurality of sensing electrodes 14B, and a plurality of ESD protection electrodes 15. At least one of the sensing electrodes 14A contacts a part of the first bridge 11A and a part of the second bridge 11B via the contact holes 13, and at least one of the ESD protection electrodes 15 contacts a part of the first bridge 11A via the contact holes 13. In other words, at least one of the sensing electrodes 14A is electrically connected with the ESD protection electrode 15 via the contact holes 13 and the first bridges 11A, and at least one of the sensing electrodes 14A is electrically connected with the adjacent sensing electrode 14A via the contact holes 13 and the second bridges 11B. It is worth noticing that the manufacturing method of the sensing structure of the touch panel in the present invention may be integrated into the current process of the touch panel, and therefore, no extra process is required. The cost and the complexity of the manufacturing process may not be increased.

Figure 5:
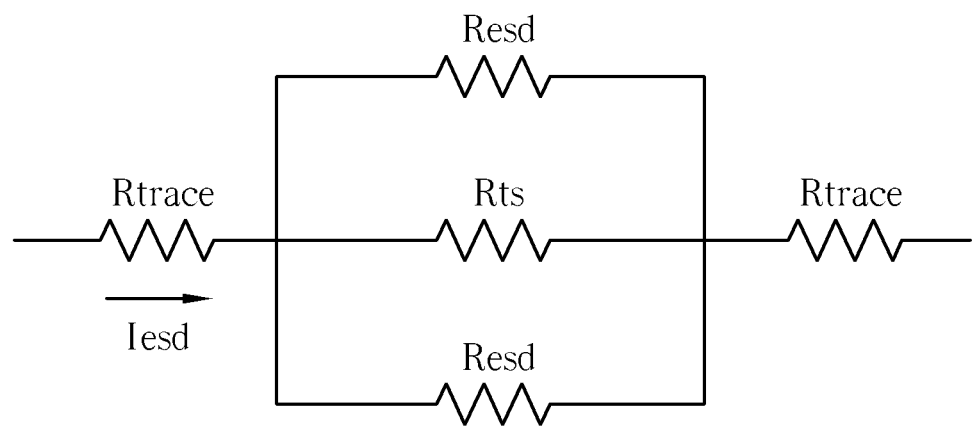
FIG. 5 is a schematic diagram illustrating the equivalent circuits of the sensing structure of the touch panel according to the preferred embodiment of the present invention.

Please refer to FIG. 5, and refer to FIG. 2 together. FIG. 5 is a schematic diagram illustrating the equivalent circuits of the sensing structure of the touch panel according to the preferred embodiment of the present invention. As shown in FIG. 5, in the first preferred embodiment of the present invention, a resistance $R_{trace}$ represents an equivalent resistance of each of the second bridges 11B, which are connected to the sensing electrodes 14A. A resistance $R_{esd}$ represents an equivalent resistance of each of the ESD protection electrodes 15 and the first bridges 11A, which are connected to the ESD protection electrodes 15. A resistance $R_{ts}$ represents an equivalent resistance of each of the sensing electrodes 14A. A sudden heavy current $I_{esd}$ may go through the second bridges 11B, which are connected to the sensing electrodes 14A in the vertical direction Y, and then the path of the heavy current $I_{esd}$ may be divided into three branches. Because the resistance $R_{esd}$ is substantially larger than the resistance $R_{ts}$, a thermal energy generated by the heavy current $I_{esd}$ may become larger at the ESD protection electrodes, and the heavy current $I_{esd}$ may damage the ESD protection electrodes more likely. Based on the design of the ESD protection electrode in the present invention, the energy of the ESD damage may be effectively scattered. The probability of damaging the connecting lines (such as the second bridges 11B) may then be decreased, and the reliability of the touch panel may be effectively improved.

Figure 6:
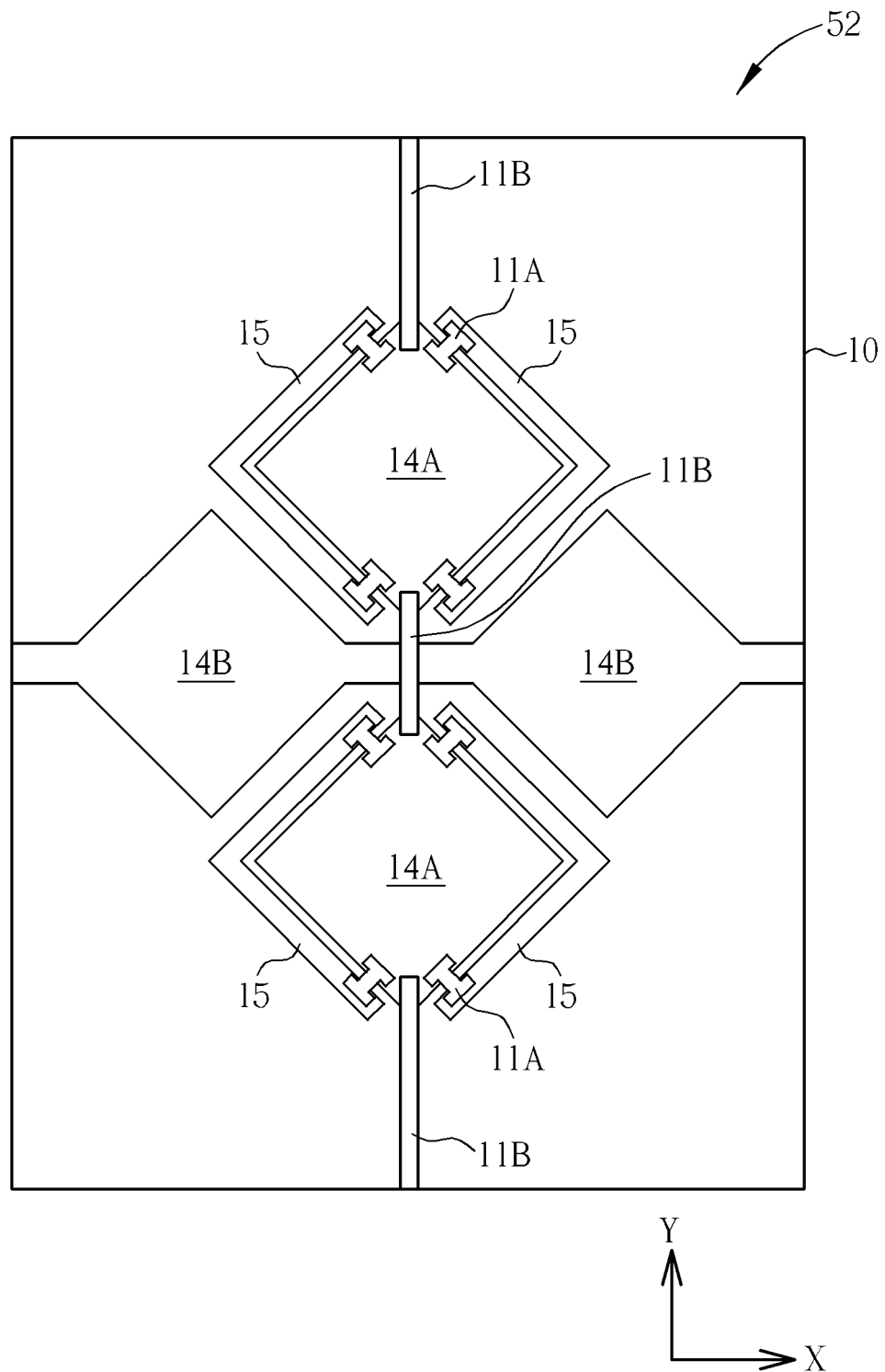
FIGS. 6-8 are schematic diagrams illustrating the sensing structure of the touch panel according to the second preferred embodiment of the present invention.
Figure 7:
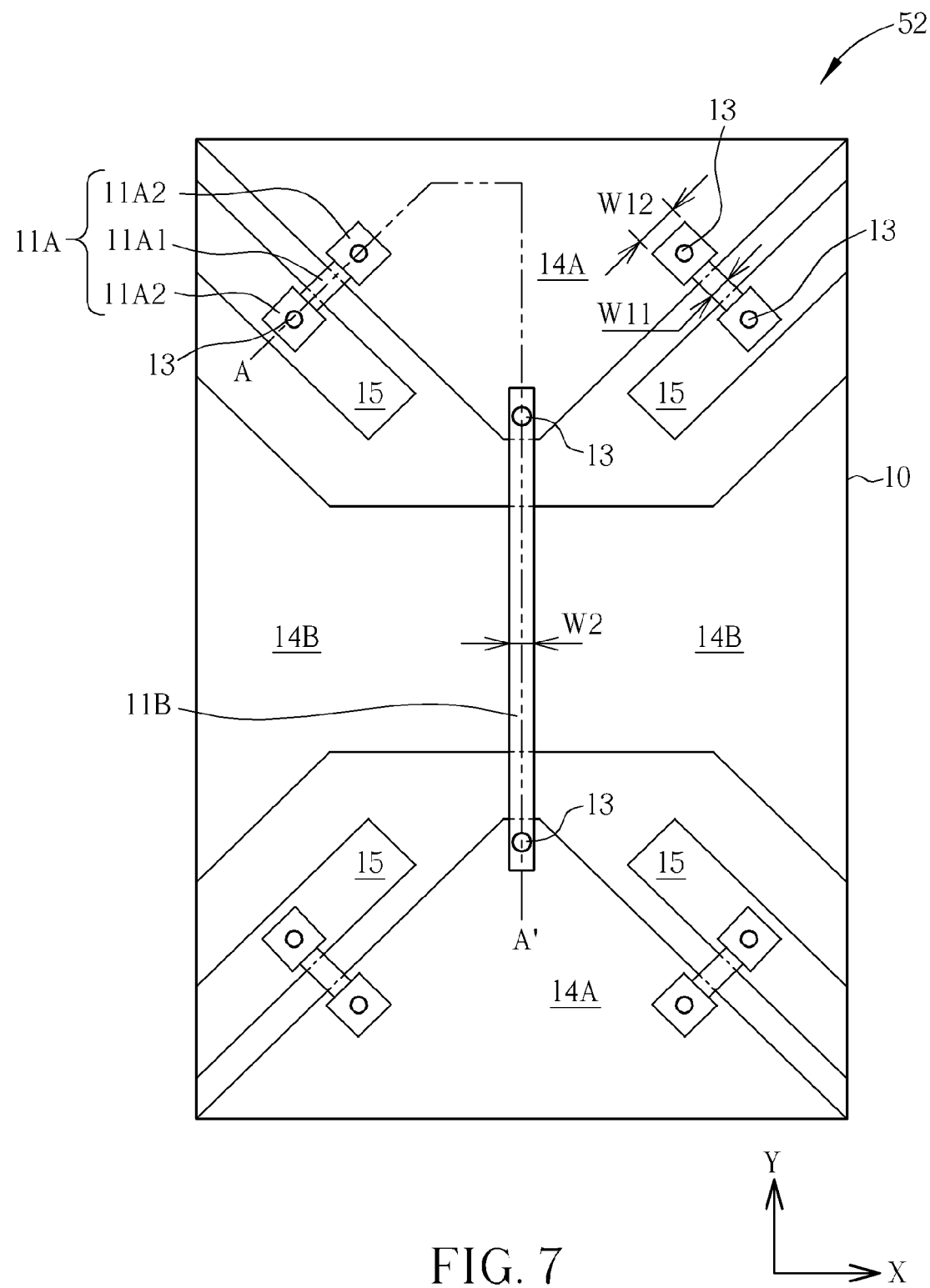
Figure 8:
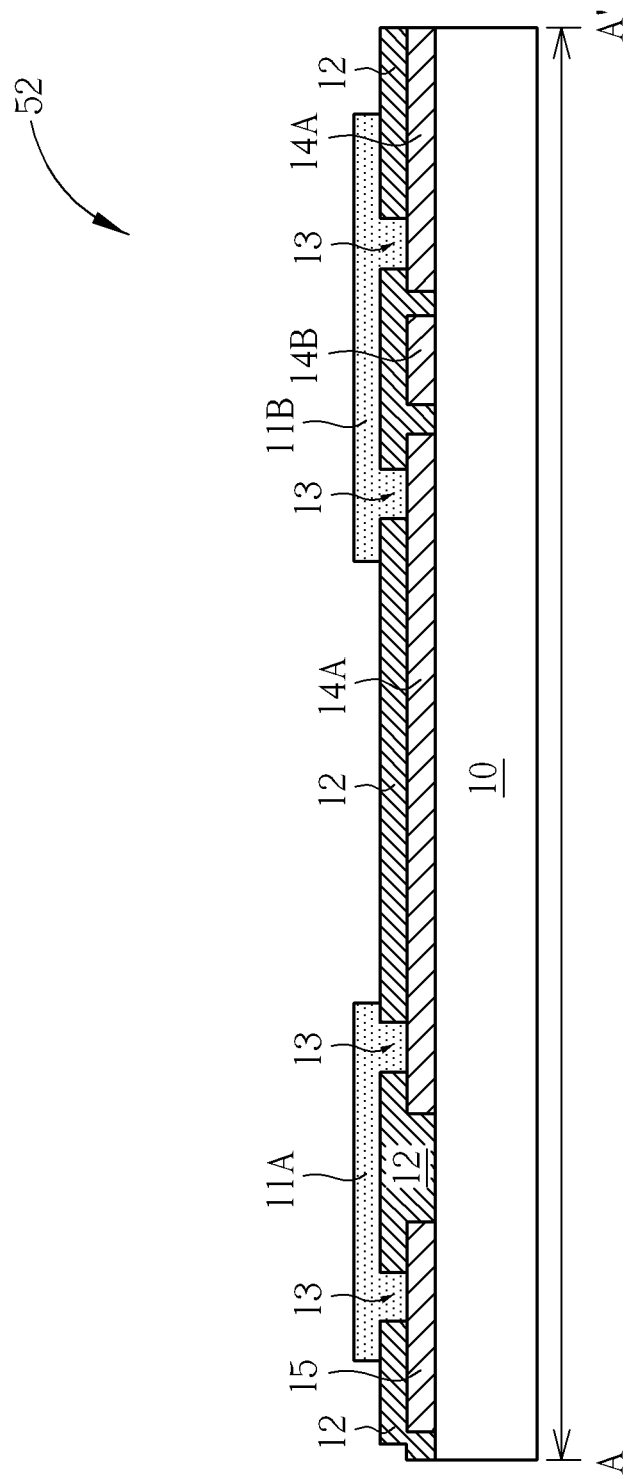

Please refer to FIGS. 6-8. FIGS. 6-8 are schematic diagrams illustrating the sensing structure of the touch panel according to a second preferred embodiment of the present invention. FIG. 6 is a schematic diagram illustrating a top view of the sensing structure of the touch panel. FIG. 7 is a perspective of a local enlargement of FIG. 6. FIG. 8 is a schematic diagram illustrating a cross-sectional view along the line A-A' in FIG. 7. In this embodiment, each of the components and the material properties of the sensing structure of the touch panel are identical with those in the first preferred embodiment mentioned above. For simplification, each of the identical components is marked with the same symbol in the first and the second preferred embodiments. As shown in FIGS. 6-8, the sensing structure 52 of the touch panel in the second preferred embodiment of the present invention includes a substrate 10, a plurality of sensing electrodes 14A/14B disposed on the substrate 10, a plurality of ESD protection electrodes 15 disposed on the substrate 10, a passivation layer 12 disposed on the sensing electrodes 14A/14B and the ESD protection electrodes 15, a plurality of first bridges 11A and second bridges 11B disposed on the passivation layer 12. The sensing electrodes 14A are disposed interlacedly with the sensing electrodes 14B, a pattern of each of the sensing electrodes 14A is separated from the pattern of other sensing electrodes 14A, and the patterns of the sensing electrodes 14B are connected in a horizontal direction X. Each of the ESD protection electrodes 15 is disposed between each of the sensing electrodes 14A and each of the sensing electrodes 14B. Each of the patterns of the ESD protection electrodes 15 is separated from the patterns of the sensing electrodes 14A and the sensing electrodes 14B. Additionally, the passivation layer 12 has a plurality of contact holes 13, and the contact holes 13 respectively expose a part of the sensing electrodes 14A and a part of the ESD protection electrodes 15. At least one of the sensing electrodes 14A is electrically connected with the ESD protection electrode 15 via the contact holes 13 and the first bridges 11A, and at least one of the sensing electrodes 14A is electrically connected with the adjacent sensing electrode 14A in a vertical direction Y via the contact holes 13 and the second bridges 11B. Please refer to FIG. 7. As shown in FIG. 7, each of the first bridges 11A includes two contact parts 11A2 and one connection part 11A1. A width W11 of the connection part 11A1 may be substantially wider than or equal to a width W2 of the second bridge 11B, and a width W12 of the contact part 11A2 may be substantially wider than the width W11 of the connection part 11A1. Preferably, the width W12 of the contact part 11A2 may be substantially equal to twice the width W11 of the connection part 11A1, but the present invention is not limited to this.

Please refer to FIG. 8, and refer to FIG. 7 together. According to the second preferred embodiment of the present invention, a manufacturing method of the sensing structure of the touch panel includes the following steps. Firstly, a substrate 10 is provided. A patterned transparent conductive layer is formed on the substrate 10 for forming a plurality of sensing electrodes 14A, a plurality of sensing electrodes 14B, and a plurality of ESD protection electrodes 15. Subsequently, a passivation layer 12 is formed to cover the substrate 10, the sensing electrodes 14A, the sensing electrodes 14B, and the ESD protection electrodes 15. Afterward, a plurality of contact holes 13 are formed in the passivation layer 12. The contact holes 13 respectively expose a part of the sensing electrodes 14A and a part of the ESD protection electrodes 15. A patterned conductive layer is then formed on the passivation layer 12 for forming a plurality of first bridges 11A and a plurality of second bridges 11B. Each of the first bridges 11A includes two contact parts 11A2 and a connection part 11A1. A width W11 of the connection part 11A1 is substantially wider than or equal to a width W2 of the second bridge 11B, and a width W12 of the contact part 11A2 may be substantially wider than the width W11 of the connection part 11A1. At least one of the sensing electrodes 14A contacts a part of the first bridge 11A and a part of the second bridge 11B via the contact holes 13, and at least one of the ESD protection electrodes 15 contacts a part of the first bridge 11A via the contact holes 13. In other words, at least one of the sensing electrodes 14A is electrically connected with the ESD protection electrode 15 via the contact holes 13 and the first bridges 11A, and at least one of the sensing electrodes 14A is electrically connected with the adjacent sensing electrode 14A via the contact holes 13 and the second bridges 11B.

Figure 9:
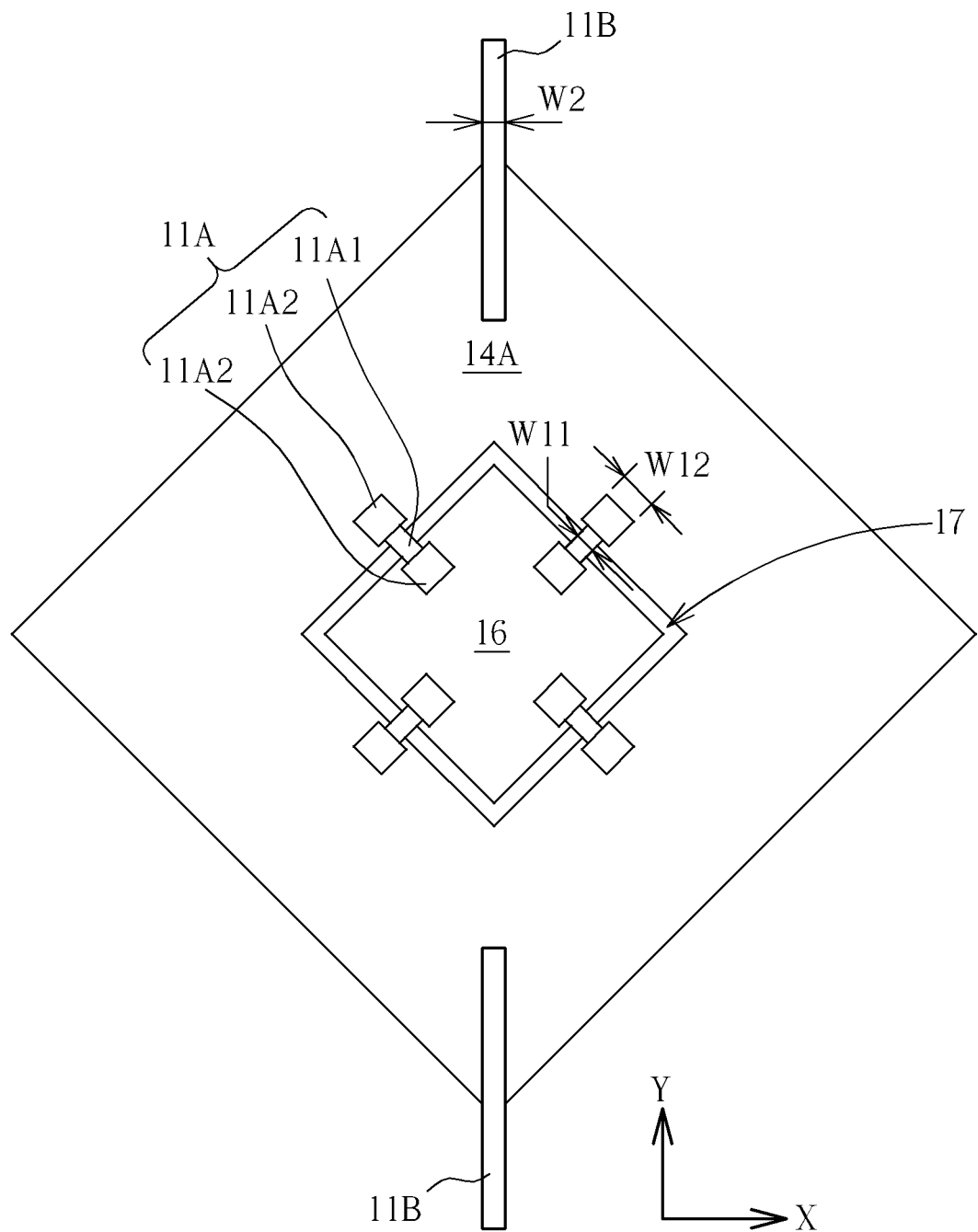
FIG. 9 is a schematic diagram illustrating a top view of the sensing structure of the touch panel according to the third preferred embodiment of the present invention.

Please refer to FIG. 9. FIG. 9 is a schematic diagram illustrating a top view of the sensing structure of the touch panel according to the third preferred embodiment of the present invention. To simplify the description, only one sensing electrode and the collocated ESD protection electrodes are illustrated in FIG. 9. The following description will detail the dissimilarities among different embodiments and the identical components will not be redundantly described. In addition, some of the components and the material properties of the sensing structure of the touch panel in this embodiment are identical to those in the first embodiment. To simplify the description, the identical components are labeled with the same mark. As shown in FIG. 9, in this embodiment, the sensing electrode 14A is a pattern of a rhombus with a hollow region 17, but the sensing electrode 14A in the present invention is not limited to this and may be other appropriate patterns with a hollow region. An ESD protection electrode 16 is disposed in the hollow region 17, and the pattern of the ESD protection electrode is separated from the pattern of the sensing electrode 14A. Each of the first bridges 11A includes two contact parts 11A2 and a connection part 11A1. A width W11 of the connection part 11A1 is substantially wider than or equal to a width W2 of the second bridge 11B, and a width W12 of the contact part 11A2 may be substantially wider than the width W11 of the connection part 11A1. At least one of the sensing electrodes 14A is electrically connected with the ESD protection electrode 16 via the contact holes 13 and the first bridges 11A, and at least one of the sensing electrodes 14A is electrically connected with the adjacent sensing electrode 14A via the contact holes 13 and the second bridges 11B. In other embodiments of the present invention, for better ESD protection effect, some of the sensing electrodes 14A and the sensing electrodes 14B may selectively be electrically connected with the ESD protection electrodes 16 inside the patterns of the sensing electrodes 14A/14B, or be electrically connected with the ESD protection electrodes 15 outside the sensing electrodes 14A/14B. The manufacturing method of the sensing structure of the touch panel in this embodiment may be identical to the manufacturing methods described in the first preferred embodiment and the second preferred embodiment. In other words, according to different design purposes, the first bridges 11A and the second bridges 11B may be disposed over the sensing electrodes 14A/14B or may be disposed under the sensing electrodes 14A/14B in this embodiment. The details of the manufacturing method of this embodiment are identical to those of the above described embodiments, and will not be redundantly described.

The equivalent circuits of the sensing structure of the touch panel according to the third preferred embodiment of the present invention may be represented by FIG. 5. Please refer to FIG. 5 again, and refer to FIG. 9 together. As shown in FIG. 5, a resistance $R_{esd}$ represents an equivalent resistance of each of the ESD protection electrodes 16 and the first bridges 11A, which are connected to the ESD protection electrodes 16. A resistance $R_{trace}$ represents an equivalent resistance of each of the second bridges 11B. A resistance $R_{ts}$ represents an equivalent resistance of each of the sensing electrodes 14A. A sudden heavy current $I_{esd}$ may go through the second bridges 11B, which are connected to the sensing electrodes 14A in the vertical direction Y. Because the resistance $R_{esd}$ is substantially larger than the resistance $R_{ts}$, a thermal energy generated by the heavy current $I_{esd}$ may become larger at the ESD protection electrodes, and the heavy current $I_{esd}$ may damage the ESD protection electrodes more likely. Based on the design of the ESD protection electrode in this embodiment, the energy of the ESD damage may be effectively scattered. The probability of damaging the connecting lines (such as the second bridges 11B) may then be decreased, and the reliability of the touch panel may be effectively improved.

Figure 10:
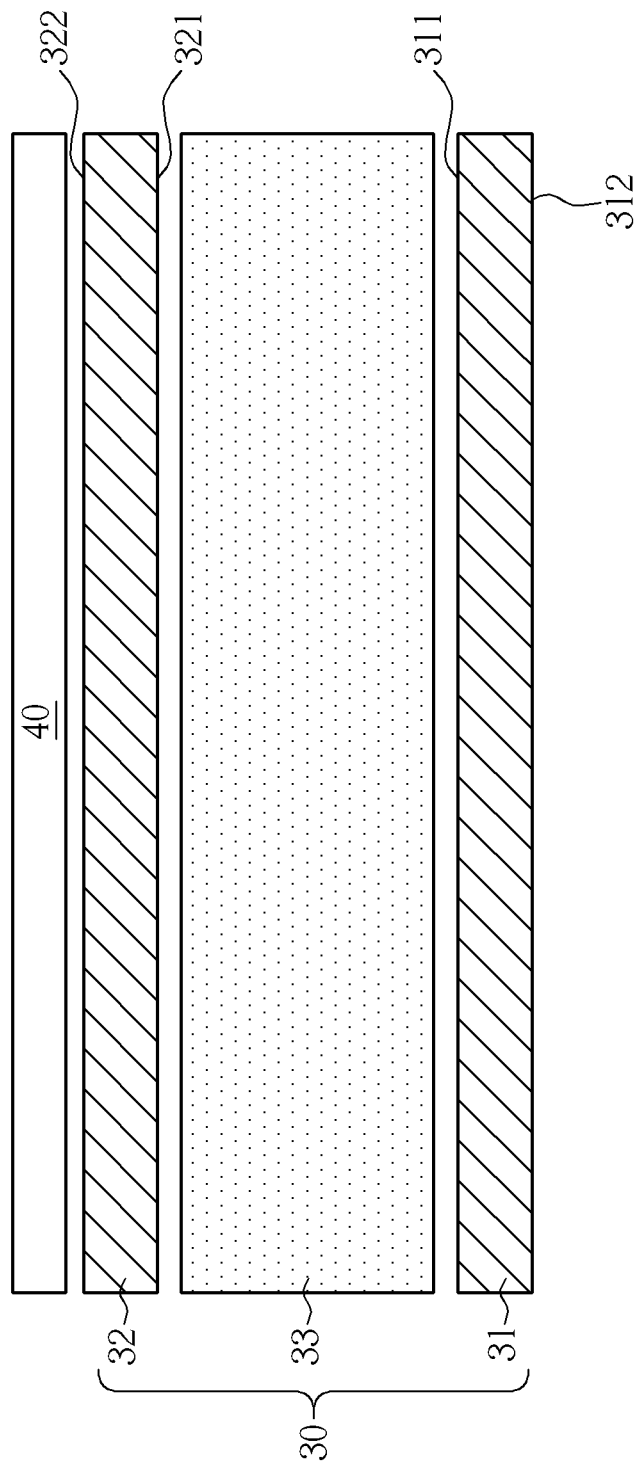
FIGS. 10-12 are schematic diagrams illustrating the collocations of the sensing structure of the touch panel and the display panel according to the present invention.
Figure 11:
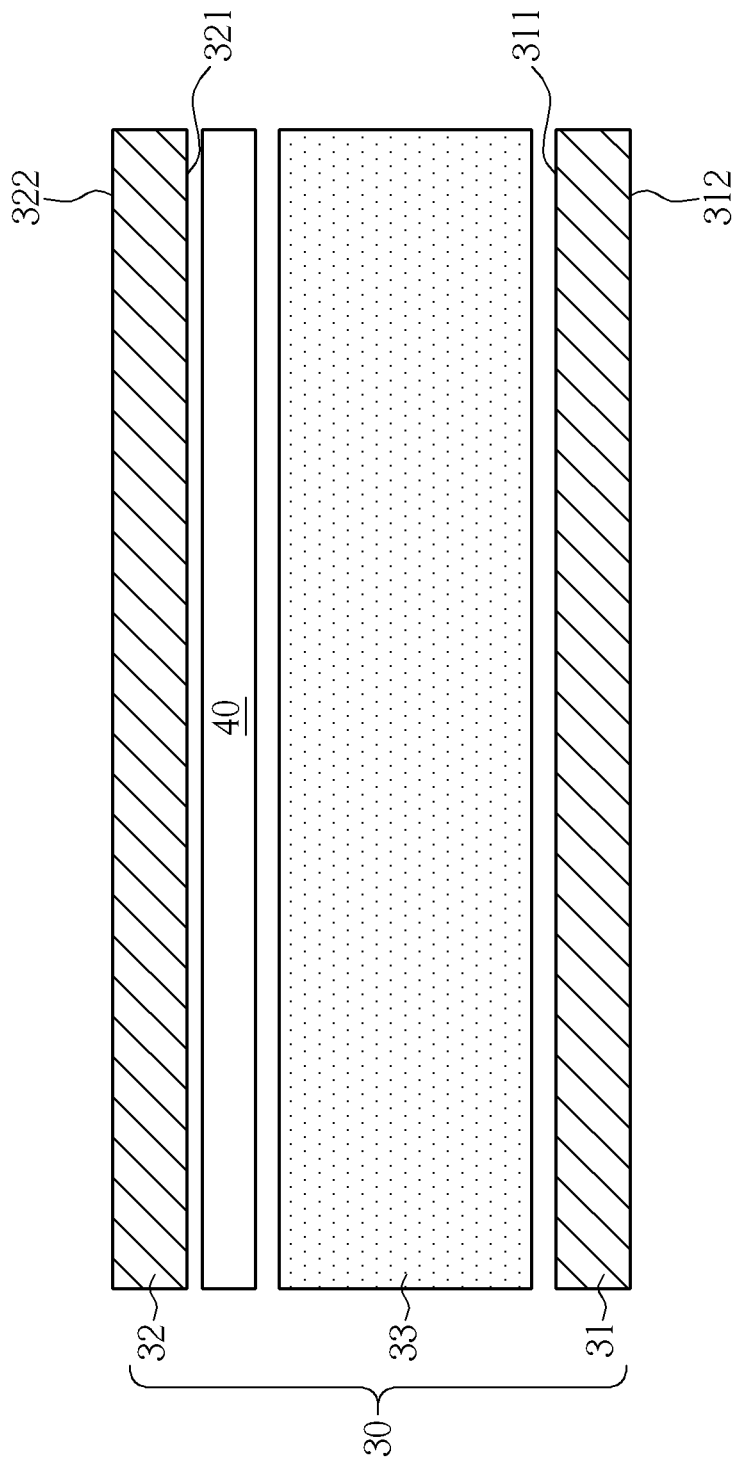
Figure 12:
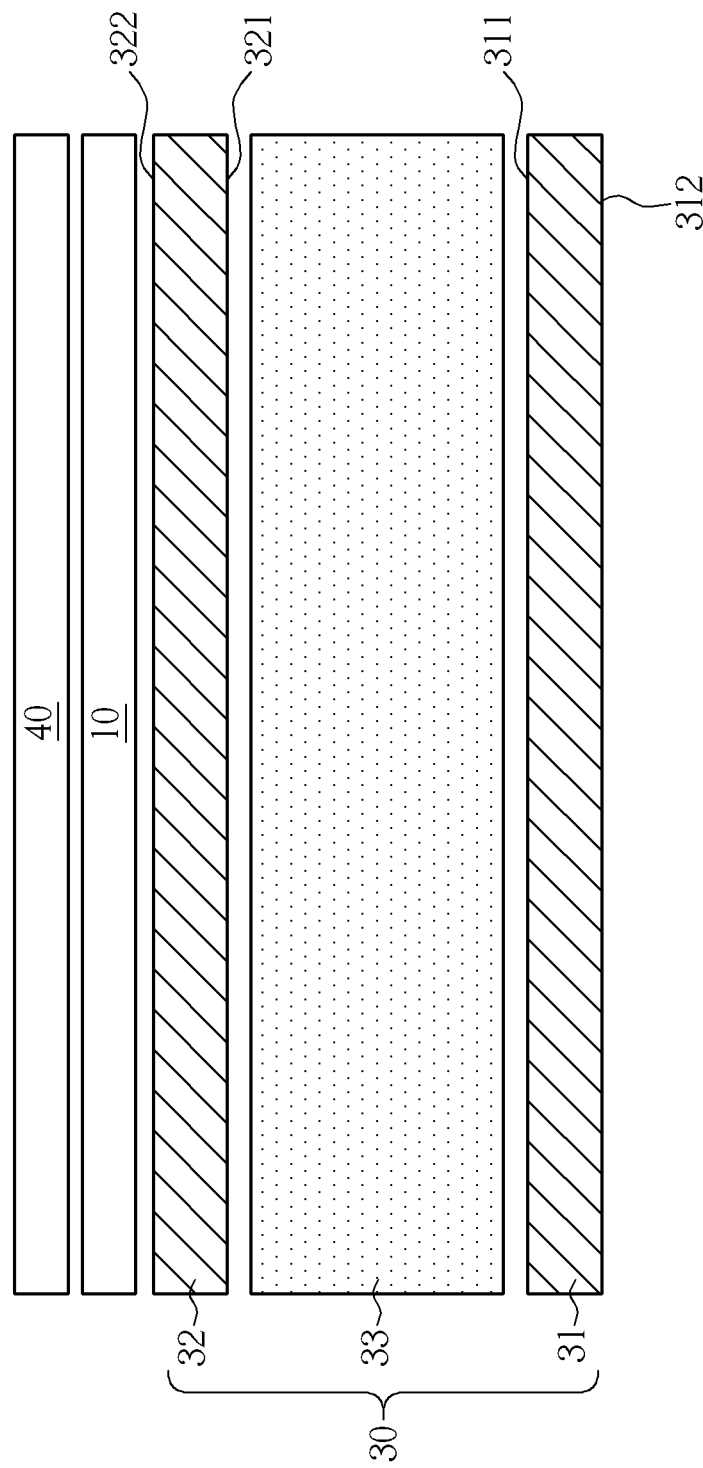

Please refer to FIGS. 10-12. FIGS. 10-12 are schematic diagrams illustrating the collocations of the sensing structure of the touch panel and the display panel according to the present invention. As shown in FIGS. 10-12, a display panel 30 includes a substrate 31, a substrate 32, and a display medium layer 33. The substrate 31 includes an inner surface 311 and an outer surface 312. The substrate 32 includes an inner surface 321 and an outer surface 322. The substrate 31 is disposed oppositely and parallel to the substrate 32. The inner surface 311 of the substrate 31 faces the inner surface 321 of the substrate 32. The display medium layer 33 is disposed between the substrate 31 and the substrate 32. To simplify the description, the sensing electrodes 14A/14B, the ESD protection electrodes 15/16, the first bridge 11A, the second bridge 11B and the passivation layer 12 in the above-mentioned embodiments are totally represented by a sensing device layer 40. As shown in FIG. 10, the substrate 10 in the above-mentioned embodiments may be the substrate 32 of the display panel 30. In other words, the sensing device layer 40 may be disposed on the outer surface 322 of the substrate 32 as an on-cell touch panel. Besides, as shown in FIG. 11, the sensing device layer 40 may be disposed on the inner surface 321 of the substrate 32 as an in-cell touch panel. Additionally, as shown in FIG. 12, the substrate 10 in the above-mentioned embodiments may be disposed on the outer surface 322 of the substrate 32 as an out-cell touch panel. In the present invention, the display panel 30 may be a liquid crystal display panel, and the substrate 32 may be a color filter substrate, a transparent substrate, or other appropriate substrate. The display panel 30 in the resent invention is not limited to the liquid crystal display panel and may be other kinds of the display devices.

To summarize all the descriptions above, the energy of the ESD damage, which may be generated during the fabrication process or the operation of the touch panel, may be released by the design of the ESD protection electrodes in the present invention. The probability of damaging the connecting lines may then be decreased, and the reliability of the touch panel may be effectively improved. Besides, the manufacturing method of the sensing structure of the touch panel in the present invention may be integrated into the current process of the touch panel, and therefore, no extra process is required, and the cost and the complexity of the manufacturing process may not be increased.

Those skilled in the art will readily observe that numerous modifications and alterations of the device and method may be made while retaining the teachings of the invention.

What is claimed is:

1. A sensing structure of a touch panel, comprising:
   a substrate;
   a plurality of sensing electrodes, disposed on the substrate;
   a plurality of electro static discharge (ESD) protection electrodes, disposed on the substrate;
   a plurality of first bridges, disposed on the substrate;
   a passivation layer, disposed between the sensing electrodes and the first bridges, and disposed between the ESD protection electrodes and the first bridges, wherein the passivation layer has a plurality of contact holes, and at least one of the sensing electrodes is electrically connected with the ESD protection electrodes via the contact holes and the first bridges; and
   a plurality of second bridges, disposed on the substrate, wherein at least one of the sensing electrodes is electrically connected with the adjacent sensing electrodes via the contact holes and the second bridges, and each of the first bridges comprises two contact parts and one connection part, wherein a width of the connection part is wider than or equal to a width of the second bridge, and a width of the contact part is wider than the width of the connection part.

2. The sensing structure of the touch panel of claim 1, wherein the passivation layer is disposed on the first bridges, and the sensing electrodes and the ESD protection electrodes are disposed on the passivation layer.

3. The sensing structure of the touch panel of claim 1, wherein the passivation layer is disposed on the sensing electrodes and the ESD protection electrodes, and the first bridges are disposed on the passivation layer.

4. The sensing structure of the touch panel of claim 1, wherein at least one of the ESD protection electrodes is disposed between the sensing electrodes adjacent to each other.

5. The sensing structure of the touch panel of claim 1, wherein at least one of the sensing electrodes comprises a hollow region, and at least one of the ESD protection electrodes is disposed in the hollow region of the sensing electrode.

6. The sensing structure of the touch panel of claim 1, wherein the substrate of the sensing structure of the touch panel is a substrate of a display panel.

7. The sensing structure of the touch panel of claim 6, wherein the ESD protection electrodes, the sensing electrodes, the first bridges and the passivation layer are disposed on an outer surface of the substrate of the display panel.

8. The sensing structure of the touch panel of claim 6, wherein the ESD protection electrodes, the sensing electrodes, the first bridges and the passivation layer are disposed on an inner surface of the substrate of the display panel.

9. The sensing structure of the touch panel of claim 1, wherein the substrate of the sensing structure of the touch panel is disposed on a substrate of a display panel.

10. The sensing structure of the touch panel of claim 1, wherein the sensing electrodes and the ESD protection electrodes are formed by an identical conductive material layer.

\* \* \* \* \*